United States Patent [19]

Young

[11] 4,178,486

[45] Dec. 11, 1979

[54] RING SENSING CIRCUIT FOR USE WITH A SERVICE EVALUATION SYSTEM

[75] Inventor: John S. Young, Addison, Ill.

[73] Assignee: GTE Automatic Electric Laboratories Incorporated, Northlake, Ill.

[21] Appl. No.: 941,993

[22] Filed: Sep. 13, 1978

[51] Int. Cl.$^2$ ............................................. H04M 1/00
[52] U.S. Cl. .............................. 179/84 R; 179/18 FA
[58] Field of Search ............ 179/175.2 B, 84 R, 84 A, 179/18 FA, 81 R

[56] References Cited

U.S. PATENT DOCUMENTS

| | | | |
|---|---|---|---|
| 3,441,683 | 4/1969 | Herter | 179/84 R |
| 3,653,018 | 3/1972 | Budrys | 179/84 R X |

Primary Examiner—Thomas A. Robinson
Attorney, Agent, or Firm—Frank J. Bogacz

[57] ABSTRACT

A ring sensing circuit for use in conjunction with a line connected between a subscriber and a switching center. The subscriber line is monitored by a service evaluation system. The ring sensing circuit in response to a microprocessor controller, detects the application of low frequency AC ringing signals applied by the switching center to the subscriber line. As a result of this ringing signal detection, the microprocessor determines that a terminating call is pending, and instructs the associated switching equipment not to switch this particular call to a service evaluation operator.

7 Claims, 2 Drawing Figures

RING SENSING CIRCUIT FOR USE WITH A SERVICE EVALUATION SYSTEM

BACKGROUND OF THE INVENTION

1. Field of the Invention

The present invention relates to the monitoring of signals applied by a central office to a subscriber line and more paticularly to a ring sensing circuit for use by a service evaluation system to detect low frequency AC ringing signals applied to a subscriber line by a switching center. The present circuit designed for inclusion in such a service evaluation system provides a digital indication of the application of ringing current to a subscriber line to an associated microprocessor controller.

2. Description of the Prior Art

In a telephone system it is necessary that an evaluation of traffic flow (telephone calls) be made in order to determine the quality and quantity of equipment that must be provided in a switching center. This equipment provides various supervisory signals such as dial tone and ringing to the subscriber line. For example, ringing is accomplished via the application of a low frequency AC voltage superimposed upon a DC bias voltage of either polarity applied at the switching center to the tip and ring leads of a line circuit.

Existing circuitry typically senses the application of such ringing voltages and supplies an analog signal as its output. A disadvantage of this type of circuit is that to obtain a digitized status of the ringing condition an analog to digital converter must be utilized. Such converters are usually expensive.

One solution is taught by U.S. Pat. No. 3,842,216 issued to James Owen et al on Oct. 15, 1974, which teaches the use of a neon lamp and a phototransistor. The output of the phototransistor is applied to a digital frequency filter for conversion. Components such as a neon lamp, phototransistor and a digital filter network are typically very expensive. Thereby, such circuitry is rendered prohibitive in applications where large numbers of such sensing circuits are required.

U.S. Pat. No. 3,808,377 which issued to applicant on Apr. 30, 1974, teaches the use of a sensing circuit including a pair of voltage divider networks with a capacitor connected between their mid-point and acting as a voltage differential detector measuring the voltage differential between the mid-points of the respective dividers. This type of circuit is useful, however, only for the detection of subscriber off-hook condition.

Therefore, it is an objective of the present invention to provide an inexpensive line ringing sensing circuit for use by a microprocessor controlled service evaluation system to provide a digital indication of the application of ringing current to a subscriber line. In addition, it is a further objective of the present invention to provide a simple circuit so that several of such circuits may be placed on a single integrated circuit using thick film techniques or incorporated on the same integrated circuit unit with the above noted off-hook detector.

SUMMARY OF THE INVENTION

The present invention consists of a ring sensing circuit for use by a service evaluation system for providing the digital status of a ringing signal associated with the application of a ringing current applied to a subscriber's line by a switching center. This ring sensing circuit includes a current sensing circuit including a diode bridge rectifier connected to the tip and ring leads of a subscriber line, a high impedance resistor connected between the diode bridge rectifier and the detection portion of the circuit. Also included in the sensing circuit is an interrogation circuit connected between the microprocessor controller and the detection portion of the circuit and a pulse transformer connected between the sensing circuit and the microprocessor controller providing the status of the application of ringing current in digital form. The detection mechanism includes a diode and a zener diode series connected anode to anode and in shunt with a capacitor.

When a sinusoidal (AC) ringing signal is applied to the tip and ring leads of the subscriber line by a switching center, the sensing circuit responds with a digital output signal which, when interrogated by the microprocessor controller, indicates the status of the application of ringing current. The signal presented to the sensing circuit is a half wave rectified version of the sinusoidal waveform applied by the switching center. During the positive cycle of this half wave rectified signal a charge is placed across the detection capacitor and the voltage appearing at the capacitor is limited by the zener diode.

In response to a pulse supplied by the microprocessor controller to the interrogation network, the charge on the capacitor will produce a current flow through the pulse transformer thereby indicating a logic "1". If no ringing current has been supplied there will be no charge on the capacitor and selection by the microprocessor will result in no current flow indicating a logic "0".

Due to the high impedance nature of the circuit, it remains permanently connected to the tip and ring leads of the subscriber line. Therefore, there is no need for relay switching to disconnect this circuit during subsequent voice transmission.

DESCRIPTION OF THE PREFERRED ENBODIMENT

Figure 2:
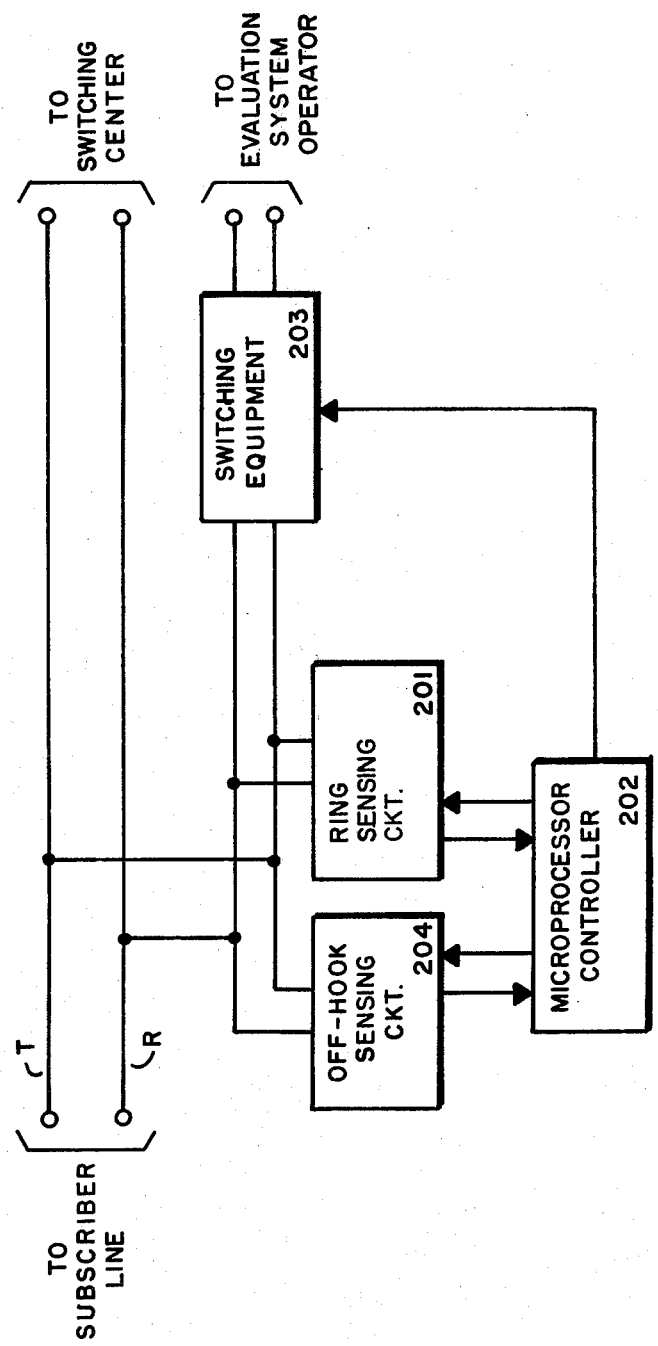
FIG. 2 is a block diagram depicting the interconnections of the ring sensing circuit between the subscriber line and its associated microprocessor controller.

FIG. 2 shows the interconnections of the ring sensing circuit 201 and the off-hook sensing circuit 204 connected between the tip lead T and ring lead R of the subscriber line and the microprocessor controller 202. When an AC ringing signal is applied at the switching center to the tip lead T or the ring lead R of the subscriber line, line ringing sensing circuit 201 determines this condition and stores an indication of it. Periodically, microprocessor controller 202 interrogates line ringing sensing circuit 201 to determine the ringing status of a given subscriber's line. Upon detection of a positive indication of ringing current, microprocessor 202 determines whether this particular line is one which is to be monitored. If such is the case, microprocessor controller 202 instructs switching equipment 203 to make no connection of this particular subscriber line to a service evaluation system operator for subsequent monitoring of the call, since it is a terminating call. Off-hook sensing circuit 204, which does not form a part of the present invention, operates in a similar manner to that described above for the line ringing sensing circuit 201, except that subscriber off-hook is the condition that is detected.

Figure 1:
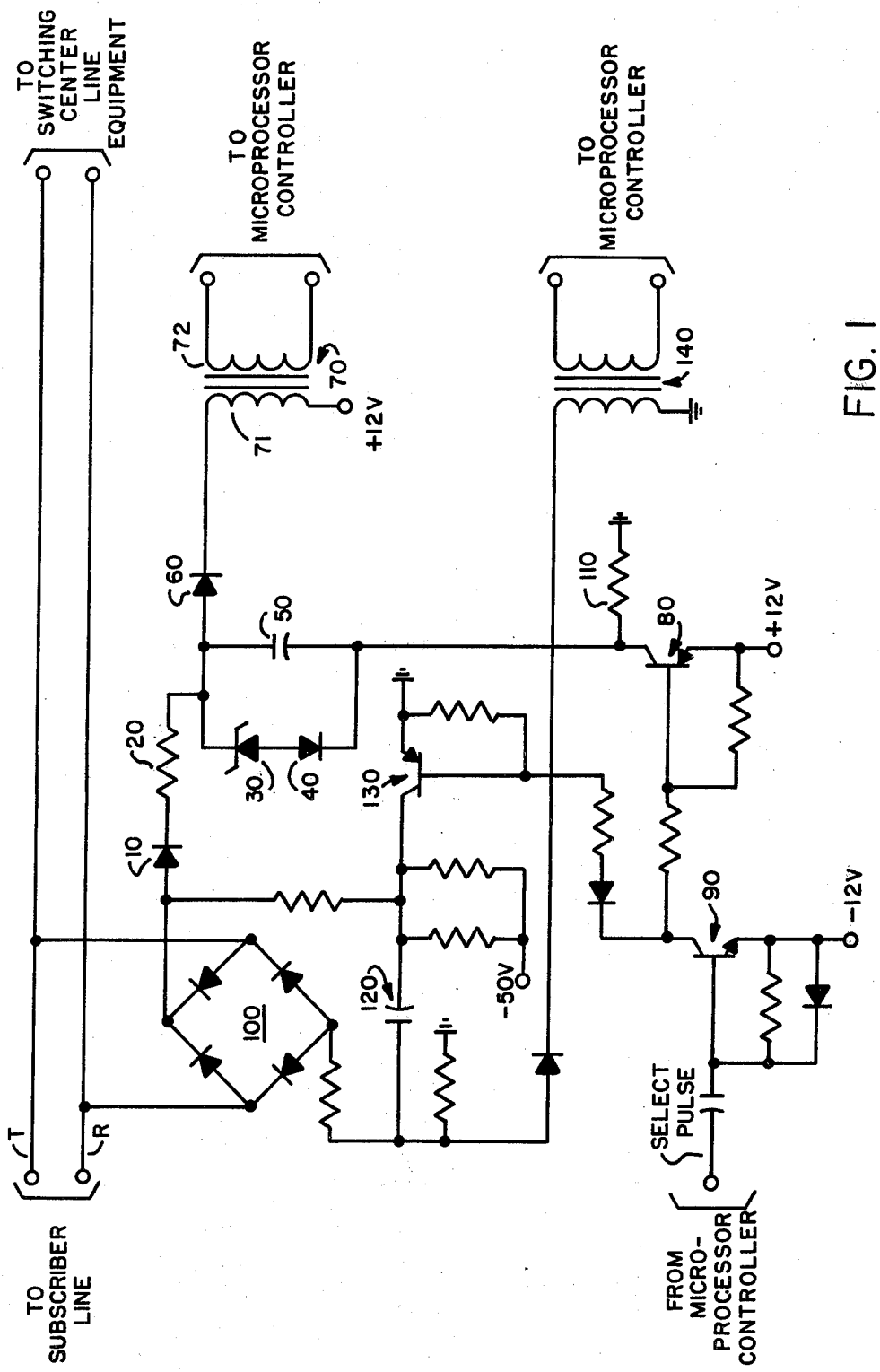
FIG. 1 is a schematic diagram of the ring sensing circuit along with its corresponding off-hook detection circuit.

Referring to FIG. 1, it is shown that bridge rectifier circuit 100 is connected to the tip lead T and ring lead R of the subscriber line circuit. Diode 10 and high impedance resistor 20 are series connected (resistor 20 connected to the cathode of diode 10) between the positive output of bridge rectifier circuit 100 and the detection circuitry. The detection circuitry is composed of zener diode 30 and diode 40 having their anodes series connected and the combination shunt connected to capacitor 50. The base of transistor 90 is connected to the microprocessor controller and the output collector of transistor 90 is connected to the base of transistor 80. The output collector of transistor 80 is connected to resistor 110 and to the common connection of diode 40 and capacitor 50. Diode 60 has its anode connected to the common connection of capacitor 50, resistor 20, and zener diode 30. The cathode of diode 60 is connected to the primary winding 71 of pulse transformer 70 with the secondary winding 72 being connected to the microprocessor controller.

Diode bridge rectifier 100 directs the positive going portions of the AC voltage applied by the switching center to the ringing sensing circuit. Ringing voltages used by telephone switching centers are low frequency AC voltages of 90 volts or more RMS and are typically referenced to the switching center's −50 volt DC primary battery. The positive going portions of the AC ringing current are conducted from the positive output of bridge rectifier circuit 100 through diode 10 and high impedance resistor 20 and through resistor 110 to ground. This causes a charge to appear across capacitor 50. Resistor 20 has a value of approximately 1,000,000 ohms.

Zener diode 30 in series with diode 40 provides a shunt across capacitor 50 to limit the charge voltage to approximately positive 10 volts, which is less than the positive 12 volts appearing at the primary 71 of pulse transformer 70. Therefore, diode 60 remains reverse biased.

Periodically, this sensing circuit is interrogated by the microprocessor controller, and such interrogation takes the form of a positive pulse of 1 microsecond duration, appearing on the select pulse lead fom the microprocessor. As a result, transistor 90 conducts and its negative 12 volt emitter potential is applied to the base of transistors 80 and 130, thereby simultaneously interrogating both the off-hook and ringing sensing circuits. Consequently, transistor 80 conducts and applies its positive 12 volt emitter potential to capacitor 50 thereby driving capacitor 50 more positive by 12 volts than its previous ground reference via resistor 110.

If there is no charge on capacitor 50, positive 12 volts will appear there and no potential difference will exist across diode 60 due to the +12 volt potential at the primary winding 71 of pulse transformer 70. However, if a 10 volt charge has accumulated on the capacitor 50 due to the presence of an AC ringing current the potential at capacitor 50 will be +22 volts resulting in a 10 volt potential across diode 60. Pulse transformer 70 will conduct this signal through secondary winding 72 to the microprocessor controller and the signal is interpreted as a logic "1", indicating the presence of ringing current. Absence of a charge on capacitor 50 is interpreted as a logic "0".

Although a preferred embodiment of the invention has been illustrated, and that form described in detail, it will be readily apparent to those skilled in the art that various modifications may be made therein without departing from the spirit of the invention or from the scope of the appended claims.

What is claimed is:

1. A ring sensing circuit for use with a service evaluation system connected to a subscriber line, said line connecting a telephone subscriber to a switching center, said ring sensing circuit comprising:
    current sensing means connected to said line, operated to detect and indicate the ringing status of said subscriber line;
    circuit status interrogation means connected between said service evaluation system and said current sensing means, operated in response to said evaluation system to determine the status of said current sensing means;
    said current sensing means further operated in response to said circuit status interrogation means to generate a binary output signal; and
    circuit status transmission means connected between said current sensing means and said service evaluation system, operated in response to said binary output signal from said current sensing means to couple said signal representing the binary status of said subscriber line to said service evaluation system.

2. A ring sensing circuit as claimed in claim 1, wherein: said current sensing means includes a bridge rectifier circuit connected to said line, energy storage means connected to said circuit status transmission means and to said circuit status interrogation means and current limiting means connected between said bridge rectifier circuit and said energy storage means.

3. A ring sensing circuit as claimed in claim 2, wherein: said current limiting means includes a diode and a high impedance resistor series connected to the cathode of said diode, operated to couple said subscriber line to said energy storage means through said bridge rectifier circuit.

4. A ring sensing circuit as claimed in claim 3, wherein: said energy storage means includes a capacitor connected between said high impedance resistor of said current limiting means and said circuit status interrogation means, and first and second diodes series connected in shunt with said capacitor.

5. A ring sensing circuit as claimed in claim 4, wherein: said first diode consists of a zener diode having its anode connected to the anode of said second diode.

6. A ring sensing circuit as claimed in claim 1, wherein: said circuit status interrogation means includes first and second transistors with respective biasing networks, operated in response to an input pulse from said service evaluation system to produce a signal for interrogating the status of said energy storage means.

7. A ring sensing circuit as claimed in claim 6, wherein: said circuit status transmission means includes a diode series connected to a primary winding of a pulse transformer and a secondary winding of said transformer connected to said evaluation system, operated in response to said produced interrogating signal of said circuit status interrogation means to transmit the status of said energy storage means in digital form.

* * * * *